Jan. 3, 1928.                                          1,654,738
J. A. KRANTZ
LOCK JOINT FOR METAL PIPES
Filed April 16, 1927

Inventor
J. A. Krantz
By Frease and Bried
Attorneys

Patented Jan. 3, 1928.

1,654,738

UNITED STATES PATENT OFFICE.

JOSEPH A. KRANTZ, OF DOVER, OHIO, ASSIGNOR TO THE REEVES MANUFACTURING COMPANY, OF DOVER, OHIO, A CORPORATION OF OHIO.

LOCK JOINT FOR METAL PIPES.

Application filed April 16, 1927. Serial No. 184,313.

The invention relates to sheet metal pipes such as stovepipes and the like and more particularly to a lock joint for such pipes.

Lock joints of various kinds have been made in the past for pipes of this kind, but there are various objections to such joints as are now in use as they not only require considerable metal for the forming of the joint but frequently necessitate apertures or slits in the outer surface of the joint which not only detract from the appearance of the pipe but leave sharp protruding edges of the metal, making the same dangerous to handle.

The object of the present invention is to provide a lock joint for a stovepipe or the like in which a minimum amount of metal is required for the formation of the joint, and in which the exterior of the pipe is smooth and unbroken and the exterior of the joint is flush.

An embodiment of the invention is illustrated in the accompanying drawing, in which—

Figure 1:
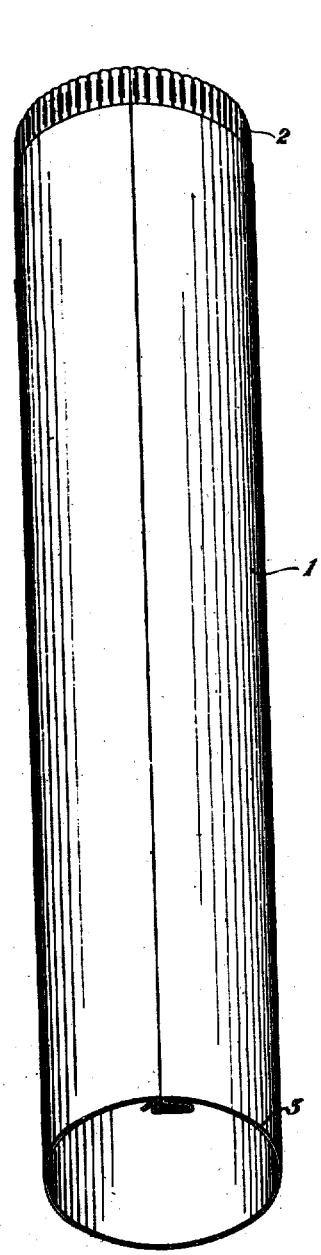
Figure 2:
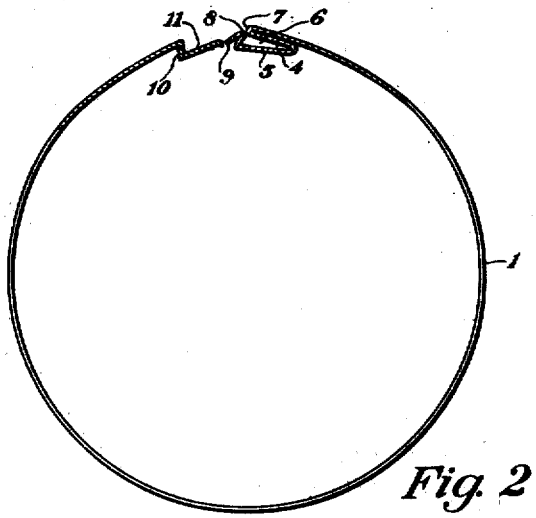
Figure 3:
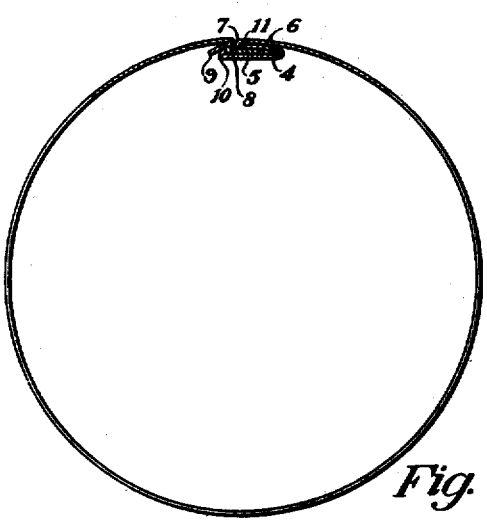
Figure 4:

Figure 1 is a perspective view of a section of stovepipe provided with the improved lock joint;

Fig. 2, a transverse sectional view through the stovepipe, showing the joint before closure;

Fig. 3, a transverse section through the stovepipe, showing the joint closed and locked, and Fig. 4, a fragmentary sectional view of a modified form of the joint.

Similar numerals refer to similar parts throughout the drawing.

It should be understood that in the manufacture of stovepipe and the like, it is desirable to provide a joint which may be easily and readily closed without the use of tools or machinery, thus permitting the sections of pipe to be shipped in open or unlocked position, permitting nesting of the pipe sections in order to conserve shipping space.

A section of stovepipe in indicated generally at 1, being formed of sheet metal and having one end reduced and crimped as at 2 in order to be inserted into the normal end 3 of a similar section.

In forming the improved lock joint, one longitudinal edge of the pipe section is folded back upon itself as shown at 4 upon the interior of the pipe and then folded in the reverse direction as shown at 5, substantially parallel to the portion 4, and forming the groove 6.

The flange 5 extends slightly beyond the folded edge 7 and terminates in an angular rearwardly disposed hooked locking shoulder 8 which may be strengthened by the angular flange 9.

The opposite edge of the pipe section is bent inwardly and rearwardly, forming a hooked locking shoulder 10, terminating in the outwardly inclined angular flange 11 which may be substantially the width of the groove 6.

The pipe sections are formed in this manner at the shop and may be nested for shipping, there being sufficient resilience in the sheet metal of which the pipe sections are formed to permit a considerable number of sections to be placed one within the other in this open condition.

When it is desired to close the joint of a section, it is only necessary to insert the angular flange 11 into the groove 6 and press the edges of the section together, the locking shoulder 10 hooking over and interlocking with the locking shoulder 8 as shown in Figs. 1 and 3, holding the joint locked in closed position.

When the joint is once locked, it will be seen that it cannot accidentally open and any pull exerted upon opposite sides of the section will only tend to pull the shoulder 10 more tightly against the shoulder 8, holding the same in interlocked condition.

A slight modification of the joint is shown in Fig. 4, in which the flange 5ª and groove 6ª are shortened, the shoulder 8ª being formed inside of the folded edge 7ª. In this form of the joint the flange 9ª may be of greater width than shown in the preferred form in order to extend beyond the folded edge 7ª to assist in inserting the flange 11ª of the other edge of the section. This flange 11ª will, of course, be narrower than shown in Figs. 1 to 3 in order to fit within the narrowed groove 6ª.

From the above description and an inspection of the accompanying drawing, it will be seen that a very simple and efficient lock joint is provided in which a minimum amount of metal is used for the formation of the joint; in which the exterior of the pipe section is flush at the joint; and in which the joint is easily and readily closed and locked against opening.

I claim:

1. A pipe section comprising a metallic sheet, one margin of which is folded flat against the inside of the sheet and then refolded to form a flange spaced from the first named fold and defining a groove, said flange terminating in a rearwardly disposed hooked locking shoulder, the other margin of the sheet being insertable into said groove and having a rearwardly disposed hooked locking shoulder for locking engagement with the first named locking shoulder.

2. A pipe section comprising a metallic sheet, one margin of which is folded flat against the inside of the sheet and then refolded to form a flange spaced from the first named fold and defining a groove, said flange terminating beyond the folded edge in a rearwardly disposed hooked locking shoulder, the other margin of the sheet being insertable into said groove and having a rearwardly disposed hooked locking shoulder for locking engagement with the first named locking shoulder.

3. A pipe section comprising a metallic sheet, one margin of which is folded flat against the inside of the sheet and then refolded to form a flange spaced from the first named fold and defining a groove, said flange terminating in a rearwardly disposed hooked locking shoulder having an angular reinforcing flange at its outer edge, the other margin of the sheet being insertable into said groove and having a rearwardly disposed hooked locking shoulder for locking engagement with the first named locking shoulder.

4. A pipe section comprising a metallic sheet, one margin of which is folded flat against the inside of the sheet and then refolded to form a flange spaced from the first named fold and defining a groove, said flange terminating beyond the folded edge in a rearwardly disposed hooked locking shoulder having an angular reinforcing flange at its outer edge, the other margin of the sheet being insertable into said groove and having a rearwardly disposed hooked locking shoulder for locking engagement with the first named locking shoulder.

In testimony that I claim the above, I have hereunto subscribed my name.

JOSEPH A. KRANTZ.

pipe section is flush at the joint; and in which the joint is easily and readily closed and locked against opening.

I claim:

1. A pipe section comprising a metallic sheet, one margin of which is folded flat against the inside of the sheet and then refolded to form a flange spaced from the first named fold and defining a groove, said flange terminating in a rearwardly disposed hooked locking shoulder, the other margin of the sheet being insertable into said groove and having a rearwardly disposed hooked locking shoulder for locking engagement with the first named locking shoulder.

2. A pipe section comprising a metallic sheet, one margin of which is folded flat against the inside of the sheet and then refolded to form a flange spaced from the first named fold and defining a groove, said flange terminating beyond the folded edge in a rearwardly disposed hooked locking shoulder, the other margin of the sheet being insertable into said groove and having a rearwardly disposed hooked locking shoulder for locking engagement with the first named locking shoulder.

3. A pipe section comprising a metallic sheet, one margin of which is folded flat against the inside of the sheet and then refolded to form a flange spaced from the first named fold and defining a groove, said flange terminating in a rearwardly disposed hooked locking shoulder having an angular reinforcing flange at its outer edge, the other margin of the sheet being insertable into said groove and having a rearwardly disposed hooked locking shoulder for locking engagement with the first named locking shoulder.

4. A pipe section comprising a metallic sheet, one margin of which is folded flat against the inside of the sheet and then refolded to form a flange spaced from the first named fold and defining a groove, said flange terminating beyond the folded edge in a rearwardly disposed hooked locking shoulder having an angular reinforcing flange at its outer edge, the other margin of the sheet being insertable into said groove and having a rearwardly disposed hooked locking shoulder for locking engagement with the first named locking shoulder.

In testimony that I claim the above, I have hereunto subscribed my name.

JOSEPH A. KRANTZ.

DISCLAIMER 1,654,738.—*Joseph A. Krantz*, Dover, Ohio. LOCK JOINT FOR METAL PIPES. Patent dated January 3, 1928. Disclaimer filed October 29, 1931, by the assignee, *The Reeves Manufacturing Company*.

Hereby disclaims all lock joints for metal pipes of the character described in claims 1, 2, 3, and 4 of said Letters Patent; except those wherein the hooked locking shoulders defined in each of said claims are located within the cylindric peripheral wall of the pipe and the exterior of the pipe is smooth and unbroken and the exterior of the joint is flush.

[*Official Gazette November 17, 1931.*]

DISCLAIMER 1,654,738.—*Joseph A. Krantz*, Dover, Ohio. LOCK JOINT FOR METAL PIPES. Patent dated January 3, 1928. Disclaimer filed October 29, 1931, by the assignee, *The Reeves Manufacturing Company*.

Hereby disclaims all lock joints for metal pipes of the character described in claims 1, 2, 3, and 4 of said Letters Patent; except those wherein the hooked locking shoulders defined in each of said claims are located within the cylindric peripheral wall of the pipe and the exterior of the pipe is smooth and unbroken and the exterior of the joint is flush.

[*Official Gazette November 17, 1931.*]